(12) United States Patent
Chen et al.

(10) Patent No.: US 11,188,744 B2
(45) Date of Patent: Nov. 30, 2021

(54) SPATIALLY SPARSE CONVOLUTIONAL NEURAL NETWORKS FOR INKING APPLICATIONS

(71) Applicant: Microsoft Technology Licensing, LLC, Redmond, WA (US)

(72) Inventors: Tianyi Chen, Redmond, WA (US); Yixin Shi, Redmond, WA (US); Sheng Yi, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 87 days.

(21) Appl. No.: 16/355,702

(22) Filed: Mar. 15, 2019

(65) Prior Publication Data

US 2020/0293770 A1 Sep. 17, 2020

(51) Int. Cl.
*G06K 9/00* (2006.01)
*G06F 17/15* (2006.01)
*G06N 3/04* (2006.01)
*G06K 9/62* (2006.01)
*G06K 9/46* (2006.01)
*G06N 3/08* (2006.01)
*G06N 20/10* (2019.01)

(52) U.S. Cl.
CPC ......... *G06K 9/00402* (2013.01); *G06F 17/15* (2013.01); *G06K 9/4628* (2013.01); *G06K 9/6267* (2013.01); *G06N 3/04* (2013.01); *G06N 3/08* (2013.01); *G06N 20/10* (2019.01); *G06K 2209/01* (2013.01); *G06T 2207/20084* (2013.01)

(58) Field of Classification Search
None
See application file for complete search history.

(56) References Cited

U.S. PATENT DOCUMENTS

2018/0046898 A1* 2/2018 Lo .................. G06F 17/16
2019/0026600 A1 1/2019 Bagherinezhad et al.

FOREIGN PATENT DOCUMENTS

WO 2018073975 A1 4/2018

OTHER PUBLICATIONS

Park, Hyunsun, et al. "Zero and data reuse-aware fast convolution for deep neural networks on GPU." Proceedings of the Eleventh IEEE/ACM/IFIP International Conference on Hardware/Software Codesign and System Synthesis. Oct. 1, 2016. (Year: 2016).*

(Continued)

*Primary Examiner* — Kim Y Vu
*Assistant Examiner* — Nathan J Bloom

(57) ABSTRACT

A spatially sparse convolutional neural network (CNN) framework is introduced to that leverages high sparsity of input data to significantly reduce the computational cost of applications that employ CNNs (e.g., inking applications and others) by avoiding unnecessary floating point mathematical operations. The framework, which is compatible with parallelized operations, includes (1) a data structure for sparse tensors that both (a) reduces storage burden and (b) speeds computations; (2) a set of sparse tensor operations that accelerate convolution computations; and (3) the merging of pooling and convolutional layers. Practical applications involving handwriting recognition and/or stroke analysis demonstrate a notable reduction in storage and computational burdens.

20 Claims, 11 Drawing Sheets

(56) References Cited

OTHER PUBLICATIONS

H. Zhan, S. Lyu and Y. Lu, "Handwritten Digit String Recognition using Convolutional Neural Network," 2018 24th International Conference on Pattern Recognition (ICPR), Beijing, Aug. 20, 2018, pp. 3729-3734, doi: 10.1109/ICPR.2018.8546100. (Year: 2018).*
Srinivas, Suraj, Akshayvarun Subramanya, and R. Venkatesh Babu. "Training sparse neural networks." Proceedings of the IEEE Conference on Computer Vision and Pattern Recognition Workshops. 2017. (Year: 2017).*
Glorot, X., Bordes, A. and Bengio, Y., Jun. 2011, Deep sparse rectifier neural networks. In Proceedings of the fourteenth international conference on artificial intelligence and statistics (pp. 315-323). (Year: 2011).*
Huang, Gao, Zhuang Liu, Laurens Van Der Maaten, and Kilian Q. Weinberger. "Densely connected convolutional networks." In Proceedings of the IEEE conference on computer vision and pattern recognition, pp. 4700-4708. 2017. (Year: 2017).*
Krizhevsky, Alex, Ilya Sutskever, and Geoffrey E. Hinton. "Imagenet classification with deep convolutional neural networks." Advances in neural information processing systems. 2012. (Year: 2012).*
"International Search Report and Written Opinion Issued in PCT Application No. PCT/US2020/019829", dated Jun. 5, 2020, 28 Pages.
"SparseConvNet", Retrieved from: https://github.com/btgraham/SparseConvNet/tree/master/SparseConvNet, Jul. 15, 2017, 05 Pages.
Graham, Benjamin, "Spatially-sparse convolutional neural networks", In Thesis Submitted to the Computing Research Repository, Department of Statistics, University of Warwick, Sep. 23, 2014, 13 Pages.
Liu, et al., "Sparse Convolutional Neural Networks", In Proceedings of IEEE Conference on Computer Vision and Pattern Recognition (CVPR), Jun. 7, 2015, pp. 806-814.

* cited by examiner

```
typedef struct Node                    200
{
    int index;
    double value;
} NodeT;
```

```
typedef struct SparseMatrix            300
{
    // number of non-zero elements
    size_t nnz;
    // order: 0: HW, 1: WH
    int order;
    int width;
    int height;
    // data array
    NodeT* X;
    NodeT** startPoints;
} SparseMatrixT;
```

FIG. 4

```
typedef struct SparseTensor                                              400
{
   // order: 0: WHC, 1: WCH, 2: WHC, 3: WCH, 4: WHC, 5: WCH
   int order;
   int width;
   int height;
   int channel;
   // number of non-zero elements
   size_t nnz;
   // data array
   NodeT* X;
   // pointers to arrays of starting nodes for each row in X
   NodeT** xRow;
   // pointers to arrays of starting nodes for each matrix in X
   NodeT*** xMat;
} SparseTensorT;
```

FIG. 5

```
typedef struct DenseTensor                                               500
{
   // order: 0: WHC, 1: WCH, 2: WHC, 3: WCH, 4: WHC, 5: WCH
   int order;
   int width;
   int height;
   int channel;
   // number of non-zero elements
   size_t nnz;
   // data array
   float* x;
   // pointers to arrays of starting nodes for each row in X
   float** xRow;
   // pointers to arrays of starting nodes for each matrix in X
   float*** xMat;
} DenseTensorT;
```

FIG. 6

```
Tensor Convolution between a sparse Tensor T1 and a Tensor T2
procedure Sparse Matrix M = tensor convolution(T1, T2, S)
  Calculate M's number of rows nr and columns nc.
    nr <- (H1 - H2)/S + 1;
    nc <- (W1 - W2)/S + 1:
  Set h <- 0.
    for i = 0; 1; … ; nr - 1 do
      for j = 0; 1; … ; nc - 1 do
        Set x <- 0;
        for l = 0; 1; … ; W2 - 1 do
          for k = 0; 1; … ;.H2 - 1 do
            Update: x <- x +
                      dot(T1.xMat[l+jS][k+iS], T2:xMat[l][k])
        if x != 0 then
          Append nonzero node into M:
            M.Xrow[h].index = j, M.Xrow[h].value = x
          Update h <- h + 1
      Add ending node into M:
        M.Xrow[h].index = -1
  return Sparse Matrix M.                                      600
```

FIG. 7

```
Inner Product between a sparse Tensor T1 and a Tensor T2     700
procedure Real Number x = inner product(T1, T2) [dot(T1, T2)]
  Set x <-0.
  while T1.index != -1 do   // exclude zero-value elements of T1
    Update
      x <- x + T2[T1.index] * T1.value
    Move pointer to adjacent elements of T1.
  return x.
```

FIG. 8

```
Sparse Matrix Transpose from WH to HW                                    800
procedure Sparse Matrix M_HW = transpose matrix(M_WH)
  Set nc as the number of columns of M_WH.
  Set nr as the number of rows of M_WH.
  Set colPtr as integers (0; 0; … ; 0)^T of length nc+1.
  Iterate M_WH.x and update colPtr such that
    colPtr[i] = the number of nodes in M_WH.x by column i
  for i = 0; 1; … ; nr - 1 do
    for node in i-th row of M_WH do
      Set
        M_HW.x[colPtr[i]].index <- i
        M_HW.x[colPtr[i]].value <- node.value
      Update colPtr[i] <- colPtr[i] + 1
  for i = 0; 1; … ; nr - 1 do
    Set ending node:
      M_HW.x[colPtr[i]].index <- -1
  return M_HW.
```

FIG. 9

```
Sparse Tensor Transpose from WHC to CHW                                  900
procedure Sparse Tensor T_CHW = transpose tensor(M_WHC)
  Set nw, nh, nc as the width, height, and channel of T_WHC.
  for each sparse matrix M_WH in T_WHC do
    Transpose M_WH into M_HW by Sparse Matrix Transpose.
  for w = 0; 1; … ; nw - 1 do
    for h = 0; 1; … ; nh - 1 do
      for c = 0; 1 … ; nc - 1 do
        if (w-th column of c-th M_HW has
              non-ending node at h-th height)
        then
          Copy this node into T_CHW with index as c.
  return T_CHW.
```

FIG. 10A

```
Forward Pass of Convolutional Layer                              1000
procedure Sparse T3 = foward pass convlayer(T1,TK1,TK2,…,TKN,S)
  for i = 1; 2; … ; N do
    Do convolution operation between sparse TI and dense Tki
      Sparse Mi <- tensor convolution(T1,Tki,S)
      where Mi (size W3, H3) is a sparse 2D matrix order WH.
  // form sparse tensor T3' (size W3, H3, N)
  Stack Mi, i = 1; 2; … ; N
  Transpose T3' from order WHC into order CHW.
    T3 <- transpose tensor(T3')
  return T3.
```

FIG. 10B

```
Merging Pooling and Convolutional Operation                      1010
procedure Sparse Matrix M = tensor_convolution_pooling(T1,T2,S,P)
  Calculate the size of matrix by only convolutional operation:
    nr_conv <- (H1 - H2)/S + 1;
    nc_conv <- (W1 - W2)/S + 1;
  Calculate nr and nc after both convolution and pooling:
    nr_pool <- [(H1 - H2)/S + 1]/P.height;
    nc_pool <- [(W1 - W2)/S + 11/P.width;
  where P denotes the pooling operator, P.height is the pooling
  operator's height and P.width is the pooling operator's width.

Set poolTrackValues as a size nc_pool array to track a node's
  value for each pooling region with size P.height x P.width.
  Set poolTrackIndexes as a size nc_pool array to track a node's
  value for each pooling region with size P.height x P.width.
     for i = 0, 1, ... , nr - 1 do
       for j = 0, 1, ... , nc - 1 do
         Set x <- 0;
         for l= 0, 1, ... , W2 - 1 do
           for k = 0, 1, ··· , H2 - 1 do
             Update: x <- x+dot(T1.xMat[l+jS][k+iS],T2.xMat[l][k])
     Update poolTrackValues [Pooling region of x] by x if needed
     Update poolTrackIndexes [Pooling region of x] by j if needed if all calculations in current pooling region are complete then
    Construct nodes from poolTrackValues and poolTrackValues.
    Insert these constructed nodes into M.
  return M.
```

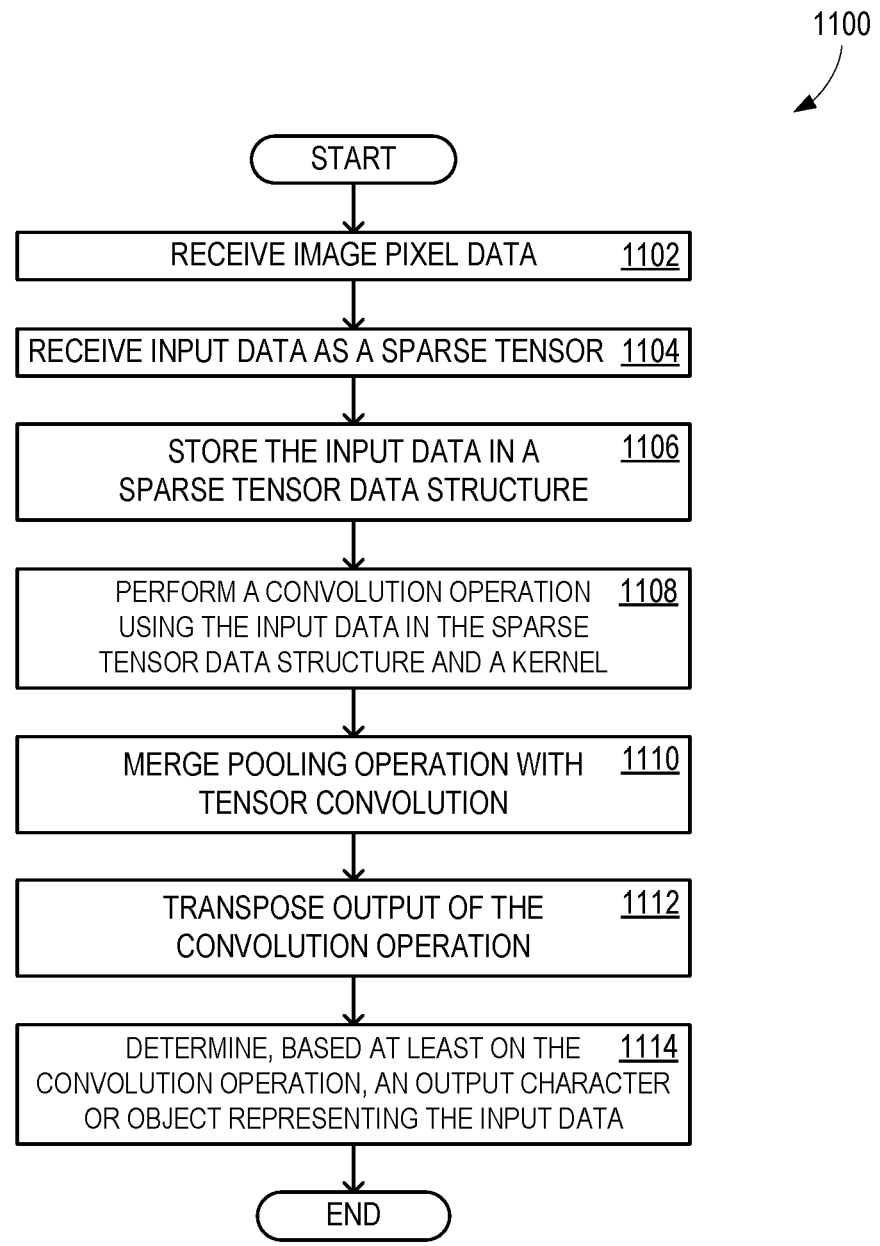

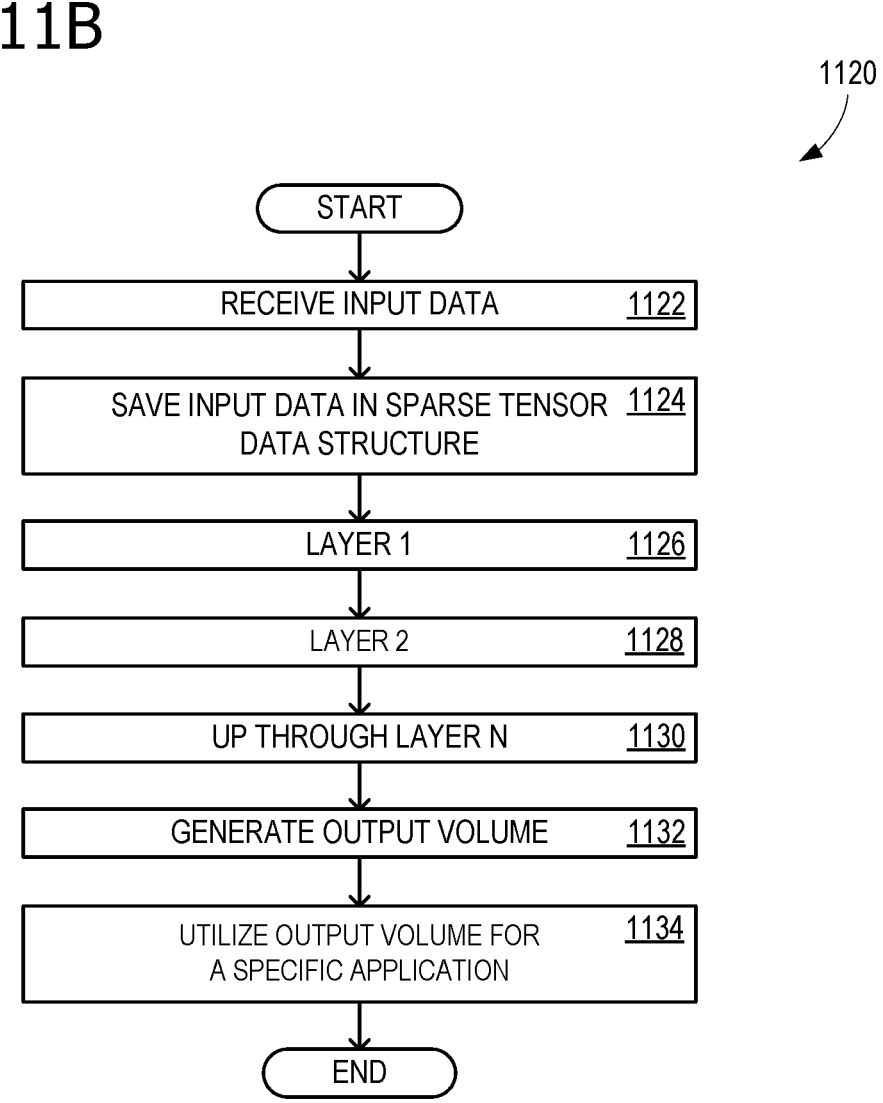

US 11,188,744 B2

SPATIALLY SPARSE CONVOLUTIONAL NEURAL NETWORKS FOR INKING APPLICATIONS

BACKGROUND

Handwriting recognition and stroke analysis are common inking functions in which an image or drawing is interpreted to extract specific classes of information, such as the presence and location of particular characters or shapes. Convolutional Neural Networks (CNNs) include a sequence of convolutional layers, which include numerous three-dimensional (3D) tensors (e.g., the input/output volumes and kernels of each convolutional layer), and are typically employed in the interpretation processes. This imposes considerable computational and memory storage burdens, due to the number of floating point mathematical operations often required. Although inking applications generate sparse tensors, conventional convolution processes do not take sufficient advantage of the sparsity to reduce the number of floating point operations.

BRIEF DESCRIPTION OF THE DRAWINGS

The disclosed examples are described in detail below with reference to the accompanying drawing figures listed below:

FIG. 4 shows a sparse tensor data structure, which can be in any of the example orders indicated according to an embodiment;

FIG. 5 shows a dense tensor data structure, which can be in any of the example orders indicated according to an embodiment;

FIG. 6 shows pseudocode for a sparse tensor convolution operation according to an embodiment;

FIG. 7 shows pseudocode for an inner product operation according to an embodiment;

FIG. 8 shows pseudocode for a sparse matrix transpose operation according to an embodiment;

FIG. 9 shows pseudocode for a sparse tensor transpose operation according to an embodiment;

FIG. 10A shows pseudocode for a forward pass of a convolutional layer according to an embodiment;

FIG. 10B shows pseudocode for merging pooling and convolutional operations according to an embodiment;

FIG. 11A is a flow chart illustrating exemplary operations involved in spatially sparse convolution for inking and other applications;

FIG. 11B is a flow chart illustrating a sparse CNN process according to an embodiment;

Corresponding reference characters indicate corresponding parts throughout the drawings.

DETAILED DESCRIPTION

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Ink analysis often relies on convolutional neural network (CNN) models for inference, but burdensome storage and computation time limits incorporation of larger models that have the potential to increase inference accuracy. Leveraging sparsity of ink data, when most pixels are blank background, accelerates CNN operations and opens options for use of improved and/or additional models as described herein. Other applications, such as electronic circuit recognition can also benefit from this framework that advantageously leverages data sparsity, if their input data is sufficiently sparse.

A spatially sparse CNN framework is introduced that leverages high sparsity of input data to significantly reduce the computational cost of applications that employ CNNs (e.g., inking applications and others) by avoiding unnecessary floating point mathematical operations. The framework, which is compatible with parallelized operations, includes (1) a data structure for sparse tensors that both (a) reduces storage burden and (b) speeds computations; (2) a set of sparse tensor operations that accelerate convolution computations; and (3) the merging of pooling and convolutional layers. Practical applications involving handwriting recognition and/or stroke analysis demonstrate a notable reduction in storage and computational burdens.

Some aspects disclosed herein are directed to a spatially sparse CNN system for inking applications comprising: a processor; and a computer-readable medium storing instructions that are operative when executed by the processor to: receive input data as a sparse tensor; store the input volume for a convolutional layer in a sparse tensor data structure, wherein the sparse tensor data structure includes a set of non-zero elements having attributes of value and index; perform convolution operation for each convolutional layer using its input volume in the sparse data structure and a set of kernels, wherein only non-zero elements of the input volume are multiplied by some elements in the kernel based on the index, wherein the non-zero element of the input data is multiplied by an element of the kernel that is indexed based at least on the index of the non-zero element of the input data; and determine, based at least on the convolution operation, an output volume in the sparse data structure for each convolutional layer. In some examples, the output volume for the last convolutional layer is used for a specific application, such as an output character or detected objects of the input data.

Figures 1, 2, 3:
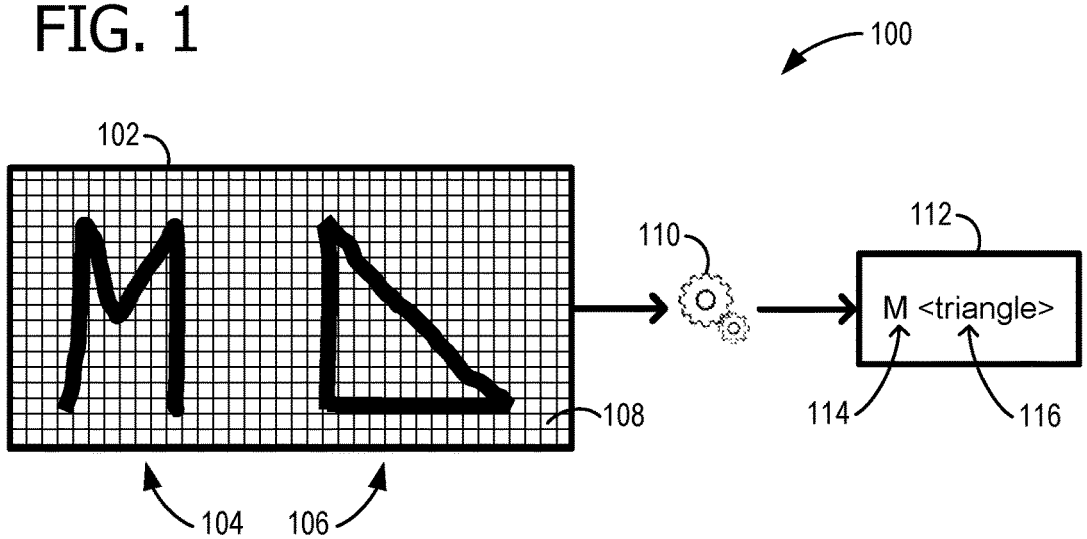
FIG. 1 illustrates an inking process that can advantageously employ spatially sparse convolution according to an embodiment.
FIG. 2 shows a data structure for a matrix or tensor element according to an embodiment.
FIG. 3 shows a sparse matrix data structure according to an embodiment.

FIG. 1 illustrates an inking process 100 that advantageously employs spatially sparse convolution. Pixel data 102 represents handwriting, specifically, a hand-written "M" 104 and a hand-drawn triangle 106 on a pixel matrix 108. Process 100 illustrates an example inking application in which text written by a human using a stylus is converted into textual characters, and sketches drawn by a human using a stylus is converted into drawing objects. Pixel data 102 is input into an inference process 110, which includes convolution; a process output 122 includes a character 114 and an object 116, identified as an "M" and a triangle, respectively. Process output 122 represents pixel data 102, but is useful for further processing, for example in other applications operated upon by a computing device 1200, which is described in more detail in relation to FIG. 12.

Pixel data 102 becomes a sparse tensor when provided as input data to process 110 when pixels corresponding to pen marks are assigned a non-zero value (e.g., binary or scalar corresponding to darkness) and background pixels, with no pen marks, are assigned a zero value. As pixel data 102 is input into process 110, pixels corresponding to pen marks become non-zero elements of the input data and background pixels become zero-value elements of the input data. Because the zero-value elements outnumber the non-zero elements in this example, pixel data 102 is represented by a sparse tensor as it is input to process 110.

For a two dimensional (2D) tensor (a matrix) $A \in R^{n \times m}$ three attributes are used to identify any element of A. These are value, row index, and column index, although in many scenarios, using one of the row index and column index is sufficient. A data structure 200 NodeT for a tensor element is shown in FIG. 2, in the syntax of the programming language C.

If a matrix (2D tensor) is highly sparse, it can be represented using nodes of the type NodeT (shown in FIG. 2) for the non-zero elements, and discarding the zero-value elements. To reduce memory usage, the nodes are saved contiguously in a defined order. For a 2D matrix, there are two commonly used orders: height-width (HW) (also known as row-column) and width-height (WH) (also known as column-row). For example, for WH order, all nodes with the index set to the column index value are sorted along each row. To facilitate sparse matrix operations, a node with the index set to negative one (−1) is used as an end-of-dimension indicator. For WH order, the end-of-dimension indicator indicates the end of a row (so that the next node starts the following row), whereas for HW order, the end-of-dimension indicator indicates the end of a column (so that the next node starts the following columns). A sparse matrix data structure 300 SparseMatrixT is shown in FIG. 3, in the syntax of the programming language C.

As an example, consider $A \in R^{3 \times 4}$, as:

$$A = \begin{bmatrix} 1.0 & 0 & 0.5 & 0 \\ 0 & 0 & 0 & 0 \\ 0 & 0.3 & 0 & 0 \end{bmatrix} \quad \text{Eq. (1)}$$

In order HW, SparseMatrix A stored in the format of sparse matrix data structure 300 has values:

$A$.nnz=3; $A$.order=0; $A$.width=4; $A$.height=3

$A.X$=[node$_0$; node$_1$; node$_{E0}$; node$_{E1}$; node$_2$; node$_{E2}$]
where node$_0$.index=0; node$_0$.value=1.0; node$_0$.index=2;
    node$_0$.value=0.5; Eq. (2)

node$_{E0}$.index=−1; node$_{E1}$.index=−1; node$_2$.index=1;
    node$_2$.value=0.3; node$_{E2}$.index=−1;

$A$.startPoints=[&node$_0$; &node$_{E1}$; &node$_2$]

In this example, the indexing of A is zero-based (e.g., the first row and first column each have an index=0). The values of the end-of-dimension indicators (nodeE$_0$, node$_{E1}$, and node$_{E2}$) are not used, and may be set to a value of 0.0. The $A$.startPoints &node$_{E1}$ indicates that the second row in A is an empty row (e.g., no non-zero elements) because the starting point for that row is the end-of-dimension indicator for that row. Because sparse matrix data structure 300 is a compressed data structure, it can represent nominally greater set of matrix elements than are occupied by memory positions, when a sufficient number of the elements are zero.

Extending the form of sparse matrix data structure 300 to a 3D tensor gives a sparse tensor data structure 400 SparseTensorT as shown in FIG. 4. There are 6 possible orders: width-height-channel (WHC), width-channel-height (WCH), height-width-channel (HWC), height-channel-width (HCW), channel-height-width (CHW), and channel-width-height (CWH). As an example, consider $T \in R^{3 \times 2 \times 2}$, as:

$$T = \begin{bmatrix} \begin{bmatrix} 1.0 & 0 & 0 \\ 0 & 0 & 0 \end{bmatrix} \\ \begin{bmatrix} 0 & 0 & 0 \\ 0 & 0.2 & 0 \end{bmatrix} \end{bmatrix} \quad \text{Eq. (3)}$$

In order WHC, SparseTensor T stored in the format of sparse tensor data structure 400 has values:

$T$.order=0; $T$.width=3; $T$.height=2; $T$.channel=2

$T.X$=[node$_0$; node$_{E0}$; node$_{E1}$; node$_{E2}$; node$_1$; node$_{E3}$]
where node$_0$.index=0; node$_0$.value=1.0; node$_{E0}$.index=−1;
    node$_{E1}$.index=−1; Eq. (4)

node$_{E2}$.index=−1; node$_0$.index=1; node$_0$.value=0.2;
    node$_{E3}$.index=−1;

$T.x$Rows=[&node$_0$; &node$_{E1}$; &node$_{E2}$; &node$_1$];
    $T.x$Mat=[&&node$_0$; &&node$_{E2}$]

In this example, the indexing of A is zero-based (e.g., the first row and first column each have an index=0). The values of the end-of-dimension indicators (node$_{E0}$, node$_{E1}$, and node$_{E2}$) are not used, and may be set to a value of 0.0. The $A$.startPoints &node$_{E1}$ indicates an empty row in A because the starting point for that row is also the end-of-dimension indicator for that row.

To construct a CNN framework that leverages the sparsity property of a tensor, sparse tensor operations, such as convolution and transpose are used. In general, unlike for dense tensor operations, sparse tensor operations use more decorated auxiliary algorithms due to additional indexing information in the underlying data structure. The CNN framework described herein provides for a convolution operation involving a first tensor in the format of sparse tensor data structure 400 and a second tensor in the format of dense tensor data structure 500 shown in FIG. 5. As an example, consider $Tk \in R^{2 \times 2 \times 2}$, as:

$$Tk = \begin{bmatrix} \begin{bmatrix} 0.5 & 0.1 \\ -0.2 & 1.0 \end{bmatrix} \\ \begin{bmatrix} 1.0 & 0.5 \\ 0.0 & -0.1 \end{bmatrix} \end{bmatrix} \quad \text{Eq. (5)}$$

DenseTensor Tk stored in the format of dense tensor data structure 500, in order CHW has values:

$$x=\{0.5;\ 1.0;\ -0.2;\ 0.0;\ 0.1;\ 0.5;\ 1.0;\ -0.1\}$$

$$x\text{Row}=\{\&0.5;\ \&-0.2;\ \&0.1;\ \&1.0\}$$

$$x\text{Mat}=\{\&\&0.5;\ \&\&0.1\} \quad\quad\text{Eq. (6)}$$

The order of operations (e.g., CHW versus WHC or another order) can affect the speed of the computations. In some examples, CHW is faster than other orders, when binary image pixel data representing handwriting is convolved with kernels for object and character detection. The order of operations is related to the order of sparse data storage (e.g., CHW versus WHC or another order), and therefore, the order of storage can affect computation speed. The dominant operations in CNN are the operations of each convolutional layer on its input volume (with a set of kernels) to generate an output volume. This total operation includes a sequence of convolutional operations on the input volumes and kernels. In the example scenarios described herein, the input volume is a 3D-tensor and typically sparse, such as binary image pixel data, which is saved in the sparse data storage format described above. The kernels are a model's trainable parameters which are also 3D tensors, but usually dense, and so saved in the dense data storage format.

FIG. 6 shows pseudocode 600 for a sparse tensor convolution operation involving a sparse first tensor, T1, in the format of sparse tensor data structure 400 and a second tensor, T2, in the format of dense tensor data structure 500. If T1 has dimensions C1, H1, and W1 representing the channel, height and width, respectively, and T2 has dimensions C2, H2, and W2 representing the channel, height and width, respectively, then the output is a sparse matrix M, with dimensions H3, and W3 representing the height and width, respectively. For T1 and T2 having order CHW, M has order WH. In some applications, multiple kernels are convolved with image data in order to determine which characters or other objects are present within the image data. Thus, a resulting output sparse tensor, T3, with dimensions C3, H3, and W3 representing the channel, height and width, respectively is formed by stacking the various outputs of pseudocode 600 (for each T2), such that C3 is equal to the number of different tensors, T2, used.

The algorithm represented by pseudocode 600 assumes that W1 is no less than or equal to W2, H1 is no less than or equal to H2, and C1 is equal to C2. Referring to the algorithm shown in FIG. 5, the number of resulting rows, and columns are determined. The output, M (eventually, T3), will be smaller than the input T1 by an amount based on the height and width (rows and columns) of the convolution kernel(s), T2.

$$W3=(W1-W2)/S+1 \quad\quad\text{Eq. (7)}$$

$$H3=(H1-H2)/S+1 \quad\quad\text{Eq. (8)}$$

where S is the stride. Stride is the jump necessary to go from one element to the next one in the specified dimension of a tensor. It is a metric for regulating the movement of various kernels across the given input volume.

In conventional convolution operations, a kernel is initially placed at a starting location within the input tensor, then element-wise multiplication is performed between the kernel and the corresponding portion of the input volume (based on kernel position) followed by a summation operation to generate a single element in M Then, the kernel slides to the next position by pre-scripted stride S, to repeat the element-wise multiplication. This is repeated until the kernel slides to the final possible location. For example, with T2 representing a kernel $Tk \in R^{2\times 2\times 2}$ the number of multiplications required for each position of the kernel is 8. The operation uses two sets of nested for-loops: two for the input tensor rows and columns, and (at each of those positions) two for the kernel rows and columns—plus another for the channels. Each of the multiplied element pairs is then summed together. By avoiding performing operations (both multiplications and additions) for the zero-value elements of a sparse tensor, the total number of computations required is reduced.

Such is the case for pseudocode 600 of FIG. 6. As each element of M is addressed, only non-zero elements (saved in the nodes of T1) are included in the computation of elements of M. This is accomplished by cycling through only the nodes of T1, rather than all row and column positions of T1. Because T1 is sparse, this is a reduction in the number of multiplications required for the convolution operation. Because exemplary sparse tensor T1 has only two non-zero elements (see Eq. (3)), only two inner product operations are used for each position of the kernel—one for each non-zero element of T1. The inner product operations are identified as the "dot" function call in pseudocode 600 of FIG. 6. The algorithm for the inner product is shown as pseudocode 700 of FIG. 7.

The multiplication operation in pseudocode 700 of FIG. 7 shows the addition (to a running summation) of the product of element value of the input tensor, T1, with the kernel, T2, which is indexed on [T1.index]. That is, the non-zero element of the input data (the value of the input tensor, T1) is multiplied by an element of the kernel, T2, that is indexed based at least on the index ([T1.index]) of the non-zero element of the input data. As described above, only the non-zero elements of included in the multiplication and summation operation because the for-loops for indexing T1 cycle through only the nodes of T1, rather than all row and column positions of T1. Since the row and column count of T1 are not available for advancing to the next row or column, the logical operation $$\text{while } T1.\text{index} !=-1 \quad\quad\text{Eq. (9)}$$

shown in pseudocode 700 is used to advance to the next row or column by skipping past end-of-dimension indicators and going to the next node (non-zero element).

However, as noted above, the output of the convolution operation shown in pseudocode 600 of FIG. 6 has order WH when T1 and T2 have order CHW. A new tensor, T3, formed by stacking the results of multiple kernels, T2, can be transposed in order to have the same CHW order as T1. This can be helpful when multiple convolution stages are used in a process. Therefore, FIG. 8 shows pseudocode 800 for a sparse matrix transpose operation that is used by pseudocode 900 for a sparse tensor transpose operation, shown in FIG. 9. Transposing a sparse matrix rearranges the nodes of a sparse matrix to switch the order from WH to HW, or the reverse. Pseudocode 800 demonstrates WH to HW, but translating to the reverse transpose is straight-forward. Whether the order is WH or HW, the number of nodes (non-zero elements) is the same. The number of end-of-dimension indicators (nodes with index set to −1) may differ, though.

The number of columns and rows is determined, and then the indices of the starting point for each column in the new order HW is calculated as colPtr, which is also further used as progress tracker in the remaining transpose operation. Next, the nodes are rearranged from order of WH into the order of HW following the progress status shown in colPtr.

Meanwhile, colPtr is updated if any node is rearranged. The transpose operation completes by setting end nodes for each column.

Similarly to the sparse matrix transpose, the sparse tensor transpose reorders the nodes in sparse tensor data structure. A sparse tensor can be formed using a sequence of sparse matrices. For the illustrated example (sparse matrix data structure 300 of FIG. 3), a 3D-tensor is transposed from order WHC to order CHW. Multiple tensor convolutions generate multiple sparse matrices which are stacked to form a new sparse tensor in a special order, such as the convolutional layer in CNNs. Because pseudocode 600 (of FIG. 6) produces matrices in order WH, directly stacking the matrices produces a tensor with order WHC. However, as noted above, sparse tensor convolution in order CHW is faster in some applications. Therefore, pseudocode 900 of FIG. 9 provides for a sparse tensor transpose operation. The algorithm in pseudocode 900 transposes a 3D tensor from order WHC to order CHW. By the definition of sparse tensor and sparse matrix data structure, a tensor in order WHC can be regarded as number of channels' sparse matrices in order WH stacked together. Therefore, the sparse matrix transpose algorithm shown by pseudocode 800 (of FIG. 8) is used to transpose each sparse matrix from order WH to order HW to form a tensor in CWH. Then, each node is iterated in CWH, reordering them if necessary to obtain a desired sparse tensor in order CHW.

FIG. 10A shows pseudocode 1000 for a forward pass of a convolutional layer. For input data as a sparse tensor in the format of sparse tensor data structure 400 (of FIG. 4), using data structure 200 (of FIG. 2) for the non-zero elements, and a set of N kernels in the format of dense tensor data structure 500 (of FIG. 5), the convolution shown in pseudocode 600 (of FIG. 6) is performed once for each kernel. Pseudocode 600 uses the inner product computation shown in pseudocode 700 (of FIG. 7). This set of N operations provides N sparse matrices in the format of sparse matrix data structure 300 (of FIG. 3), which also uses data structure 200 for the non-zero elements. The resulting output sparse tensor is transposed using the algorithms shown in pseudocode 800 (of FIG. 8) and pseudocode 900 (of FIG. 9). As noted above, pseudocode 900 transposes 3D sparse tensors, and calls pseudocode 800 to transpose the 2D sparse matrix. This transpose operation returns the output sparse tensor to the same order as the input data sparse tensor.

CNNs may include pooling layers, which combine the outputs of neuron clusters at one layer into a single neuron in the next layer. For example, max pooling uses the maximum value from each of a cluster of neurons at the prior layer. Another example is average pooling, which uses the average value from each of a cluster of neurons at the prior layer. A pooling layer has an input volume (tensor) and an output volume (tensor), with an additional mask. It applies a mask to the input volume to obtain a reduced-size output volume, mainly for controlling size of intermediate data and filtering out non-informative data. In some examples, pooling operations are merged with convolutional operations, which is more efficient than performing convolution and pooling separately.

FIG. 10B shows pseudocode 1010 for merging pooling and convolutional operations. In some examples, the merged convolutional and pooling operation is processed as following. At first, the resulting matrix size is calculated using the parameters of convolutional and pooling operators. Then, convolutional operations are performed, as described above. However, during this operation, when an element is generated, it is used to update two arrays used for tracking values and indices for each pooling region. When the pooling regions are complete, a sequence of nodes is constructed with values from the tracking value array and indices from the tracking index array. A matrix is generated in a sparse matrix data structure in order WH by merging convolutional and pooling operations.

FIG. 11A is a flow chart 1100 illustrating exemplary operations involved in spatially sparse convolution for inking and other applications. In some examples, operations described for flow chart 1100 are performed by computing device 1200 of FIG. 12. Flow chart 1100 commences in operation 1102 with receiving image pixel data. In some examples, the pixel data represents handwriting. Operation 1104 includes receiving input data as a sparse tensor, for example as a result of converting pixel data to binary matrices. In some examples, the received input data comprises a 3D tensor. Operation 1106 includes storing the input data in a sparse tensor data structure. The sparse tensor data structure includes at least one non-zero element having a value and an index. In some examples, the sparse tensor data structure omits, excludes, or otherwise does not include, zero-value elements of the input data. In some examples, the sparse tensor data structure includes an end-of-dimension indicator.

Operation 1108 includes performing a convolution operation using the input data in the sparse tensor data structure and a kernel, wherein the non-zero element of the input data is multiplied by an element of the kernel that is indexed based at least on the index of the non-zero element of the input data. In some examples, the convolution operation omits, excludes, or otherwise does not include, multiplication operations for zero-value elements of the input data. In some examples, performing the convolution operation comprises performing a convolution operation on CHW ordered data. Operation 1110 includes merging a pooling operation with tensor convolution. Operation 1112 includes transposing an output of the convolution operation. In some examples, the transposing is from WHC order to CHW order. Operation 1114 then includes determining, based at least on the convolution operation, an output character or object representing the input data.

Figure 11C:
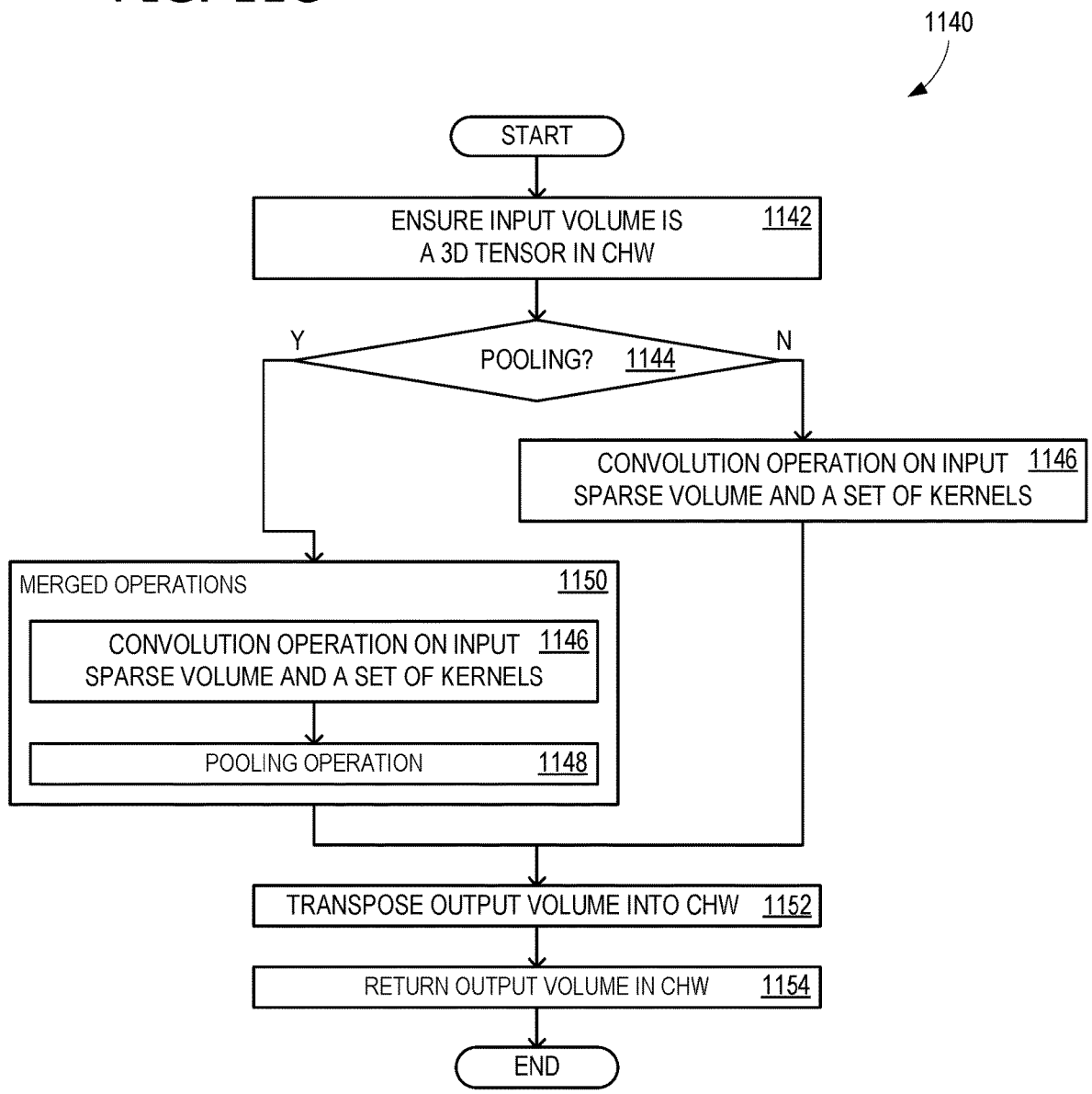
FIG. 11C is a flow chart illustrating operations within each layer of the CNN process illustrated in FIG. 11B according to an embodiment.

FIG. 11B is a flow chart 1120 illustrating a sparse CNN process. Input data is received in operation 1122 and stored in the sparse tensor data structure (sparse tensor format) in operation 1124. The first, second, and other layers (up through layer N) are convolved in operations 1126-1130, as described in more detail in relation to FIG. 11B. This generates the output volume in operation 1132, which is used in a specific application, such as inking or another object recognition application, in operation 1134. FIG. 11C is a flow chart 1140 illustrating operations within each of the layers indicated in flow chart 1120 (e.g., operations 1126, 1128, and 1130). Operation 1142 ensures that the input volume is in order CHW, and transposes it, if necessary. Decision operation 1144 determines whether pooling is to be used. If not, the operation performs convolution on the sparse input volume, using a set of kernels. If pooling is to be used, a merged operation 1150 combines a version of operation 1146 with a pooling operation 1148, as described above for FIG. 10B. the output is transposed into order CHW in operation 1152, and returned as the layer result in operation 1154.

Figure 11D:
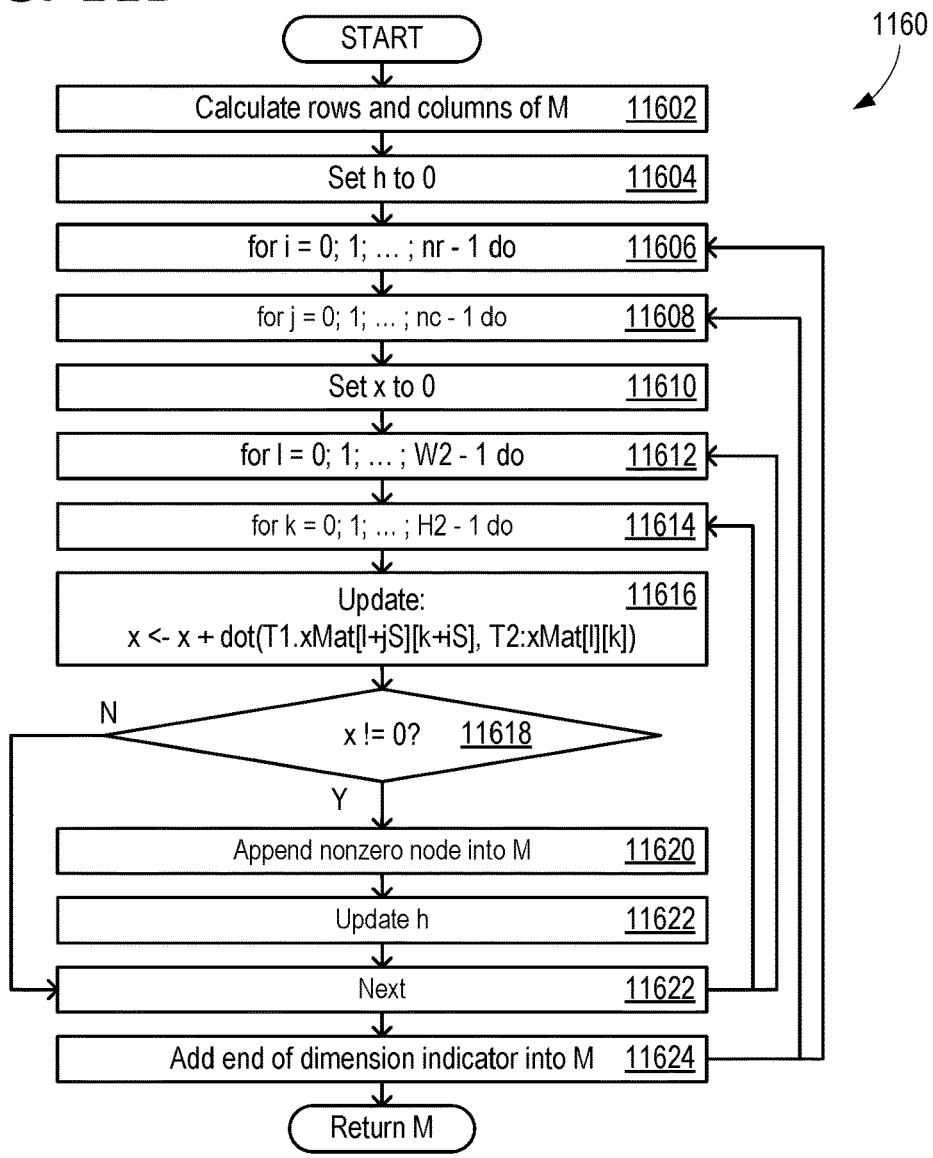
FIGS. 11D-11G are flow charts corresponding to the pseudocode of FIGS. 6 through 9 according to an embodiment.
Figure 11E:
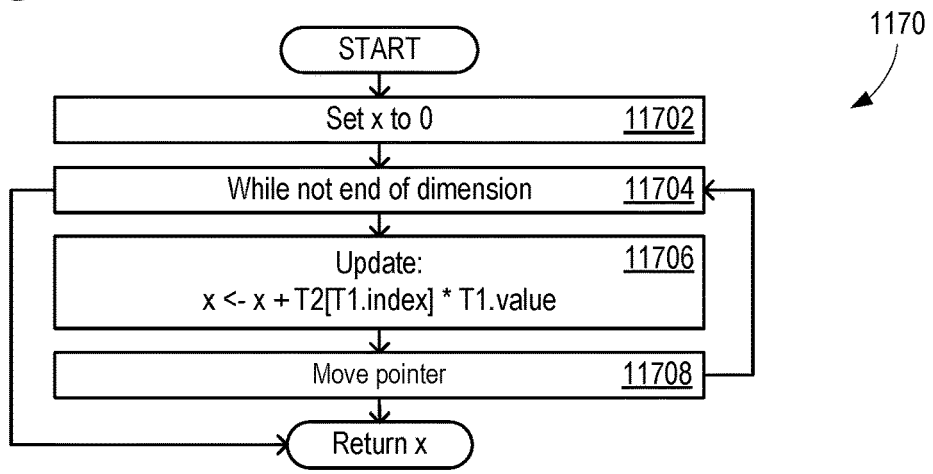

FIG. 11D is a flow chart 1160 corresponding to pseudocode 600 (of FIG. 6). Operations 11602 through 11624 perform the convolution operation described above. Operations 11602, 11604, and 11610 set up data for the loops, which are implemented using operations 11606, 11608,

11612, 11614, and 11622. Operation 11616 updates the value of the element (x), and if it is non-zero, according to decision operation 11618, it is added into the output matrix, M in operation 11620. An end-of-dimension indicator (node with index of −1) is added into M, in operation 11624. Upon completion, a sparse matrix M is returned. FIG. 11E is a flow chart 1170 corresponding to pseudocode 700 (of FIG. 7). Operation 11702 initializes the starting value of x, and if the node is not an end of dimension indicator (as determined in operation 11704), x is updated in operation 11706. The pointer is moved in 11708, and the value is returned, when complete.

Figure 11F:
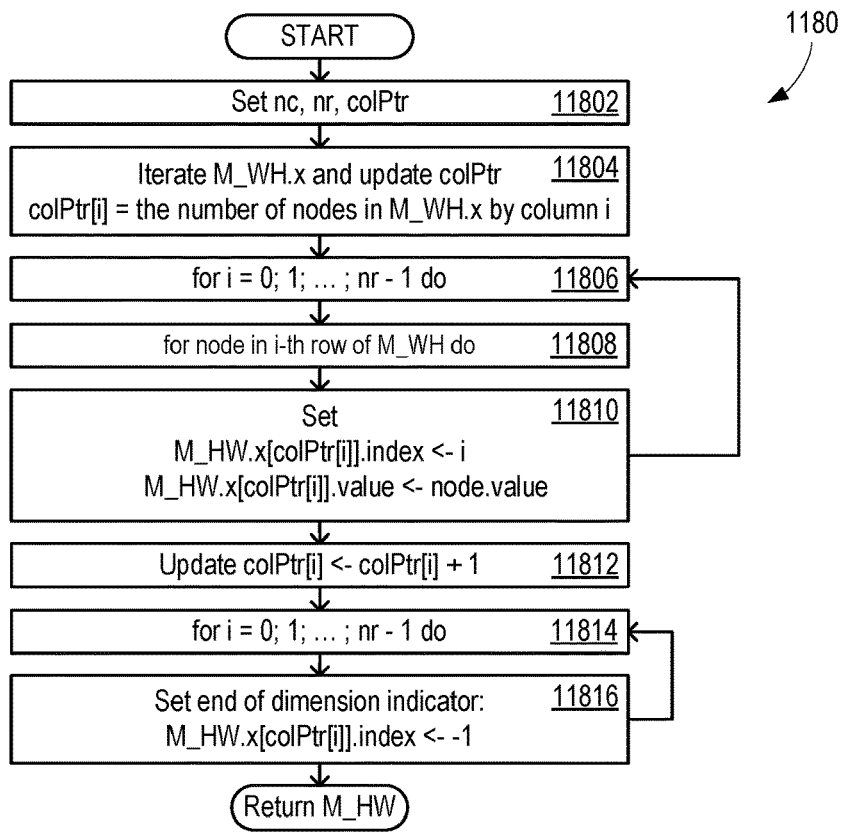
Figure 11G:
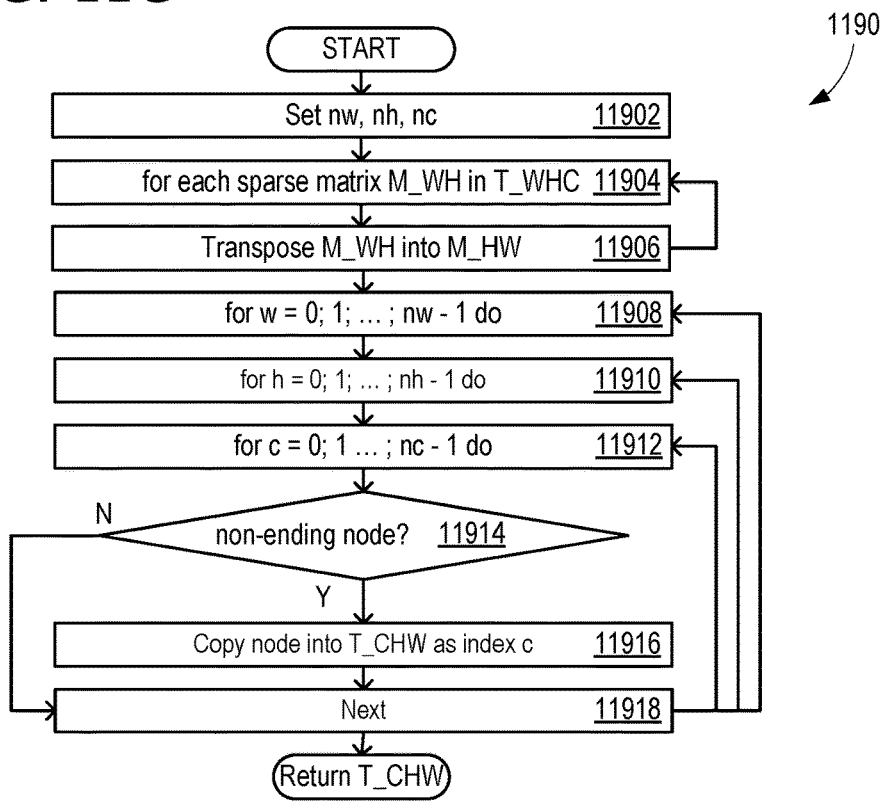

FIG. 11F is a flow chart 1180 corresponding to pseudocode 800 (of FIG. 8). Operations 11802 through 11816 perform the sparse matrix transpose operation described above. Operations 11802 and 11804 set up data for iterating M_WH and updating colPtr. The first loop, which is implemented using operations 11806 through 11810 sets indices and values in the nodes. The colPtr is updated in operation 11812 (moving to the next column) and operations 11814 and 11816 set end of dimension indicators. Upon completion, the transposed M_HW is then returned. FIG. 11G is a flow chart 1190 corresponding to pseudocode 900 (of FIG. 9). Operation 11902 sets up data for the loops, and operations 11904 and 11906 transpose the matrices (using flow chart 1180). The loops are implemented in operations 11908, 11910, 11912, and 11918. For non-ending nodes, (e.g., nodes that are not end of dimension indicators), as determined in decision operation 11914 the node is copied into the transposed tensor, T_CHW. Upon completion, the transposed T_CHW is returned.

ADDITIONAL EXAMPLES

Some aspects and examples disclosed herein are directed to a spatially sparse CNN system for inking applications comprising: a processor; and a computer-readable medium storing instructions that are operative when executed by the processor to: receive input data as a sparse tensor; store the input data in a sparse tensor data structure, wherein the sparse tensor data structure includes a non-zero element having a value and an index; perform a convolution operation using the input data in the sparse tensor data structure and a kernel, wherein the non-zero element of the input data is multiplied by an element of the kernel that is indexed based at least on the index of the non-zero element of the input data; and determine, based at least on the convolution operation, an output character or object representing the input data.

Additional aspects and examples disclosed herein are directed to a method of spatially sparse convolution for inking applications comprising: receiving input data as a sparse tensor; storing the input data in a sparse tensor data structure, wherein the sparse tensor data structure includes a non-zero element having a value and an index; performing a convolution operation using the input data in the sparse tensor data structure and a kernel, wherein the non-zero element of the input data is multiplied by an element of the kernel that is indexed based at least on the index of the non-zero element of the input data; and determining, based at least on the convolution operation, an output character or object representing the input data.

Additional aspects and examples disclosed herein are directed to one or more computer storage devices having computer-executable instructions stored thereon for spatially sparse convolution, which, on execution by a computer, cause the computer to perform operations comprising receiving input data as a sparse tensor, wherein the received input data comprises a 3D tensor; storing the input data in a sparse tensor data structure, wherein the sparse tensor data structure includes a non-zero element having a value and an index, wherein the sparse tensor data structure omits, or otherwise does not include, zero-value elements of the input data, and wherein the sparse tensor data structure includes an end-of-dimension indicator; performing a convolution operation using the input data in the sparse tensor data structure and a kernel, wherein the non-zero element of the input data is multiplied by an element of the kernel that is indexed based at least on the index of the non-zero element of the input data, wherein the convolution operation omits, or otherwise does not include, multiplication operations for zero-value elements of the input data, and wherein performing the convolution operation comprises performing a convolution operation on CHW ordered data; and transposing an output of the convolution operation from WHC order to CHW order.

Alternatively, or in addition to the other examples described herein, examples include any combination of the following:
the received input data comprises a 3D tensor;
the sparse tensor data structure does not include zero-value elements of the input data;
the sparse tensor data structure includes an end-of-dimension indicator;
the convolution operation does not include multiplication operations for zero-value elements of the input data;
performing the convolution operation comprises performing a convolution operation on CHW ordered data;
the instructions are further operative to transpose an output of the convolution operation from WHC order to CHW order;
transposing an output of the convolution operation from WHC order to CHW order;
the input data is pixel data;
the input data represents handwriting; and
the input data is pixel data representing handwriting, and wherein the operations further comprise determining, based at least on the convolution operation, an output character or object representing the input data.

While the aspects of the disclosure have been described in terms of various examples with their associated operations, a person skilled in the art would appreciate that a combination of operations from any number of different examples is also within scope of the aspects of the disclosure.

Example Operating Environment

Figure 12:
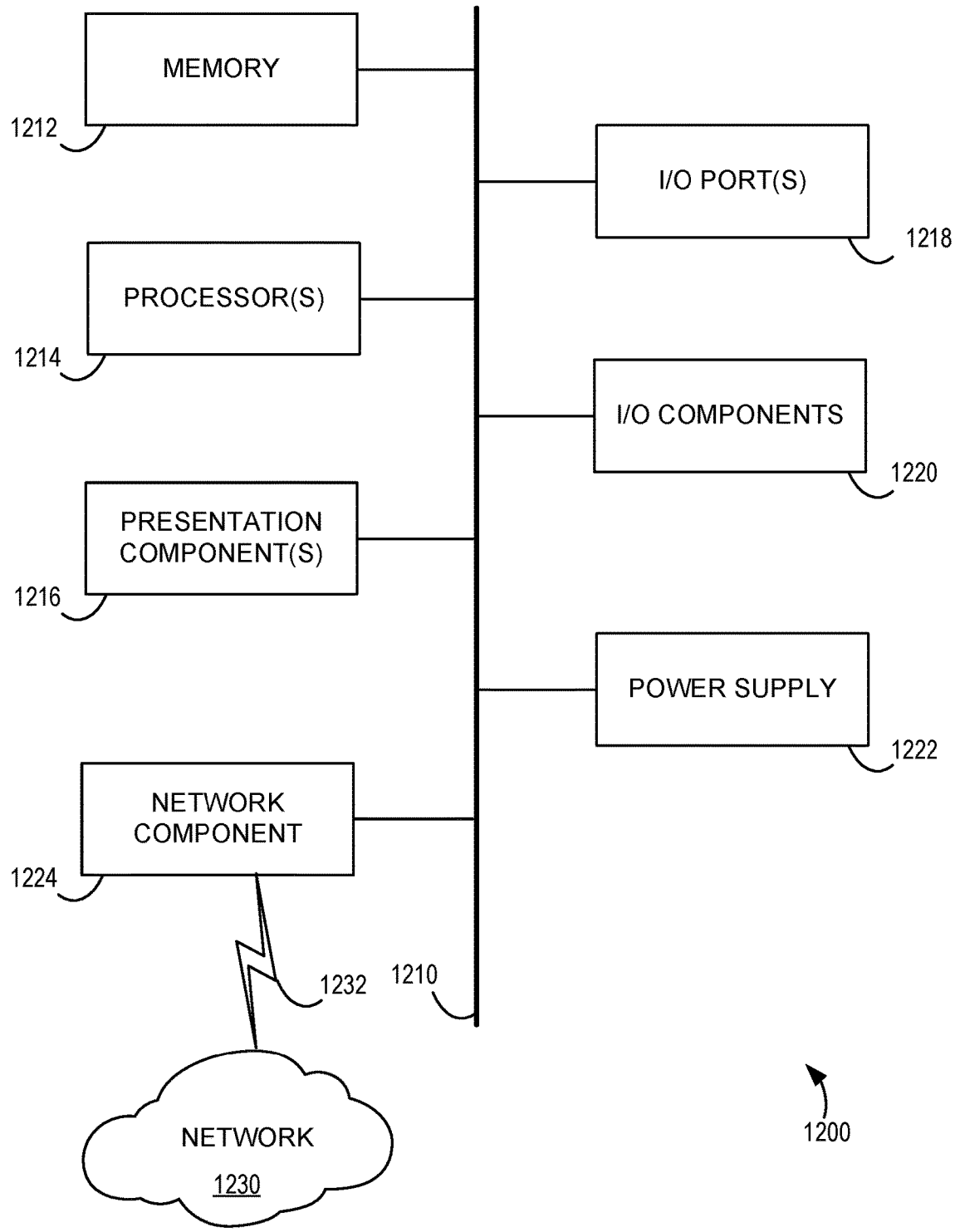
FIG. 12 is a block diagram of an example computing environment suitable for implementing some of the various examples disclosed herein.

FIG. 12 is a block diagram of an example computing device 1200 for implementing aspects disclosed herein, and is designated generally as computing device 1200. Computing device 1200 is but one example of a suitable computing environment and is not intended to suggest any limitation as to the scope of use or functionality of the examples disclosed herein. Neither should the computing device 1200 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The discloses examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1200 includes a bus 1210 that directly or indirectly couples the following devices: computer-storage memory 1212, one or more processors 1214, one or more presentation components 1216, input/output (I/O) ports 1218, I/O components 1220, a power supply 1222, and a network component 1224. While computer device 1200 is depicted as a seemingly single device, multiple computing devices 1200 may work together and share the depicted device resources. For instance, computer-storage memory 1212 may be distributed across multiple devices, processor(s) 1214 may provide housed on different devices, and so on.

Bus 1210 represents what may be one or more busses (such as an address bus, data bus, or a combination thereof). Although the various blocks of FIG. 12 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and reiterate that the diagram of FIG. 12 is merely illustrative of an exemplary computing device that can be used in connection with one or more disclosed examples. Distinction is not made between such categories as "workstation," "server," "laptop," "hand-held device," etc., as all are contemplated within the scope of FIG. 12 and the references herein to a "computing device." Computer-storage memory 1212 may take the form of the computer-storage media references below and operatively provide storage of computer-readable instructions, data structures, program modules and other data for the computing device 1200. For example, computer-storage memory 1212 may store an operating system, a universal application platform, or other program modules and program data. Computer-storage memory 1212 may be used to store and access instructions configured to carry out the various operations disclosed herein.

As mentioned below, computer-storage memory 1212 may include computer-storage media in the form of volatile and/or nonvolatile memory, removable or non-removable memory, data disks in virtual environments, or a combination thereof. And computer-storage memory 1212 may include any quantity of memory associated with or accessible by the computing device 1200. The memory 1212 may be internal to the computing device 1200 (as shown in FIG. 12), external to the computing device 1200 (not shown), or both (not shown). Examples of memory 1212 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the computing device 1200. Additionally, or alternatively, the computer-storage memory 1212 may be distributed across multiple computing devices 1200, e.g., in a virtualized environment in which instruction processing is carried out on multiple devices 1200. For the purposes of this disclosure, "computer storage media," "computer-storage memory," "memory," and "memory devices" are synonymous terms for the computer-storage memory 1212, and none of these terms include carrier waves or propagating signaling.

Processor(s) 1214 may include any quantity of processing units that read data from various entities, such as memory 1212 or I/O components 1220. Specifically, processor(s) 1214 are programmed to execute computer-executable instructions for implementing aspects of the disclosure. The instructions may be performed by the processor, by multiple processors within the computing device 1200, or by a processor external to the client computing device 1200. In some examples, the processor(s) 1214 are programmed to execute instructions such as those illustrated in the flow charts discussed below and depicted in the accompanying drawings. Moreover, in some examples, the processor(s) 1214 represent an implementation of analog techniques to perform the operations described herein. For example, the operations may be performed by an analog client computing device 1200 and/or a digital client computing device 1200. Presentation component(s) 1216 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1200, across a wired connection, or in other ways. Ports 1218 allow computing device 1200 to be logically coupled to other devices including I/O components 1220, some of which may be built in. Examples I/O components 1220 include, for example but without limitation, a microphone, joystick, game pad, satellite dish, scanner, printer, wireless device, etc.

The computing device 1200 may operate in a networked environment via the network component 1224 using logical connections to one or more remote computers. In some examples, the network component 1224 includes a network interface card and/or computer-executable instructions (e.g., a driver) for operating the network interface card. Communication between the computing device 1200 and other devices may occur using any protocol or mechanism over any wired or wireless connection. In some examples, the network component 1224 is operable to communicate data over public, private, or hybrid (public and private) using a transfer protocol, between devices wirelessly using short range communication technologies (e.g., near-field communication (NFC), Bluetooth branded communications, or the like), or a combination thereof. For example, network component 1224 communicates over communication link 1232 with network 1230.

Although described in connection with an example computing device 1200, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A spatially sparse convolutional neural network (CNN) system for inking applications, the system comprising:
   at least one processor; and
   a computer-readable medium storing instructions that are operative when executed by the at least one processor to:
      receive input data as a sparse tensor;
      store the input data in a sparse tensor data structure, wherein the sparse tensor data structure includes a non-zero element having a value and an index;
      perform a convolution operation using the input data in the sparse tensor data structure and a kernel, wherein the non-zero element of the input data is multiplied by an element of the kernel that is indexed based at least on the index of the non-zero element of the input data;
      transpose a three-dimensional (3D) tensor output of the convolution operation from a first order to a second order, wherein each of the first order and the second order comprises a width, height, and channel, wherein the width is a number of columns of pixels, the height is a number of rows of pixels, and the channel represents a number of convolutions stages or processes; and
      determine, based at least on the transposed 3D tensor output of the convolution operation, an output character or object representing the input data.

2. The system of claim 1, wherein the received input data comprises a three dimensional (3D) tensor.

3. The system of claim 1, wherein the sparse tensor data structure omits zero-value elements of the input data.

4. The system of claim 1, wherein the sparse tensor data structure includes an end-of-dimension indicator.

5. The system of claim 1, wherein the convolution operation omits multiplication operations for zero-value elements of the input data.

6. The system of claim 1, wherein performing the convolution operation comprises performing the convolution operation on channel-height-width (CHW) ordered data.

7. The system of claim 1, wherein the 3D transposed 3D tensor output is a 3D matrix.

8. The system of claim 1, wherein the first order is width-height-channel (WHC) order and the second order is channel-height-width (CHW) order.

9. The system of claim 1, wherein the input data represents handwriting.

10. A method of spatially sparse convolution for inking applications, the method comprising:
- receiving input data as a sparse tensor;
- storing the input data in a sparse tensor data structure, wherein the sparse tensor data structure includes a non-zero element having a value and an index;
- performing a convolution operation using the input data in the sparse tensor data structure and a kernel, wherein the non-zero element of the input data is multiplied by an element of the kernel that is indexed based at least on the index of the non-zero element of the input data;
- transposing an output of the convolution operation from a first order to a second order, wherein each of the first order and the second order comprises a width, height, and channel, wherein the width is a number of columns of pixels, the height is a number of rows of pixels, and the channel represents a number of convolutions stages or processes; and
- determining, based at least on the transposed output of the convolution operation, an output character or object representing the input data.

11. The method of claim 10, wherein the received input data comprises a three dimensional (3D) tensor.

12. The method of claim 10, wherein the sparse tensor data structure omits zero-value elements of the input data.

13. The method of claim 10, wherein the sparse tensor data structure includes an end-of-dimension indicator.

14. The method of claim 10, wherein the convolution operation omits multiplication operations for zero-value elements of the input data.

15. The method of claim 10, wherein performing the convolution operation comprises performing the convolution operation on channel-height-width (CHW) ordered data.

16. The method of claim 10, further comprising:
- transposing an output of the convolution operation from width-height-channel (WHC) order to channel-height-width (CHW) order.

17. The method of claim 10, wherein the input data is pixel data.

18. The method of claim 10, wherein the input data represents handwriting.

19. One or more computer storage devices having computer-executable instructions stored thereon for spatially sparse convolution, which, on execution by a computer, cause the computer to perform operations comprising:
- receiving input data as a sparse tensor, wherein the received input data comprises a three dimensional (3D) tensor;
- storing the input data in a sparse tensor data structure, wherein the sparse tensor data structure includes a non-zero element having a value and an index, wherein the sparse tensor data structure omits zero-value elements of the input data, and wherein the sparse tensor data structure includes an end-of-dimension indicator;
- performing a convolution operation using the input data in the sparse tensor data structure and a kernel, wherein the non-zero element of the input data is multiplied by an element of the kernel that is indexed based at least on the index of the non-zero element of the input data, wherein the convolution operation omits multiplication operations for zero-value elements of the input data, and wherein performing the convolution operation comprises performing the convolution operation on channel-height-width (CHW) ordered data; and
- transposing an output of the convolution operation from a first order to a second order, wherein each of the first order and the second order comprises a width, height, and channel, wherein the width is a number of columns of pixels, the height is a number of rows of pixels, and the channel represents a number of convolutions stages or processes.

20. The one or more computer storage devices of claim 19, wherein the input data is pixel data representing handwriting, and wherein the operations further comprise:
- determining, based at least on the convolution operation, an output character or object representing the input data.

* * * * *